United States Patent
Vaughn et al.

(10) Patent No.: US 9,531,888 B2
(45) Date of Patent: Dec. 27, 2016

(54) INTELLIGENT RINGER IN SMARTPHONES

(71) Applicant: Intel Corporation, Santa Clara, CA (US)

(72) Inventors: Robert Lawson Vaughn, Portland, OR (US); Tobias Kohlenberg, Portland, OR (US); Omer Sezer, Hillsboro, OR (US); Charles Baron, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 14/592,112

(22) Filed: Jan. 8, 2015

(65) Prior Publication Data

US 2016/0205267 A1 Jul. 14, 2016

(51) Int. Cl.
*H04M 19/04* (2006.01)
*H04M 1/725* (2006.01)

(52) U.S. Cl.
CPC ....... *H04M 19/044* (2013.01); *H04M 1/72569* (2013.01); *H04M 19/047* (2013.01); *H04M 19/048* (2013.01)

(58) Field of Classification Search
CPC .......... H04W 4/10; H04W 4/08; H04W 4/206; H04W 4/12; H04W 4/16; H04W 76/005
See application file for complete search history.

(56) References Cited

U.S. PATENT DOCUMENTS

| | | | |
|---|---|---|---|
| 9,075,435 B1* | 7/2015 | Noble | G06F 3/013 |
| 2014/0163997 A1* | 6/2014 | Jiang | H04M 1/72544 704/275 |
| 2015/0223110 A1* | 8/2015 | Lindner | H04L 65/4061 455/518 |
| 2016/0151603 A1* | 6/2016 | Shouldice | H04R 3/00 600/28 |

* cited by examiner

*Primary Examiner* — Bobbak Safaipour
(74) *Attorney, Agent, or Firm* — Schwegman Lundberg & Woessner, P.A.

(57) ABSTRACT

Various systems and methods for an intelligent ringer in smartphones are described herein. A system for implementing intelligent notifications includes a communication module to receive at a compute device, an indication of an incoming communication, a notification module to present from the compute device, a notification of the incoming communication, an audio processing module to determine whether a change in ambient noise occurs around the compute device while the notification is being presented, and a rules module to reference a rules engine to determine an action based on whether the change in ambient noise occurs, where the notification module is to present the notification in accordance with the action.

23 Claims, 4 Drawing Sheets

INTELLIGENT RINGER IN SMARTPHONES

TECHNICAL FIELD

Embodiments described herein generally relate to mobile device management and in particular, to an intelligent ringer in smartphones.

BACKGROUND

Many mobile phones are configurable to operate in a normal mode or a quiet mode. In a normal mode the mobile phone may use an audible ring tone to notify the user of an incoming call, notifications, or other alerts. In a quiet mode, such audible ring tones or alerts may be suppressed or reduced.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide an intelligent ringer in a smartphone. Mobile phones are eminently useful devices. They may be used by themselves or in conjunction with other devices. For example, a mobile phone may be paired with another device such as a Bluetooth headset or a vehicle infotainment system. When an incoming call is detected, the phone or an associated device may ring. Many phones provide a silent or quiet mode so that the user may reduce or eliminate the audible ringing. Such silent or quiet modes are typically enabled manually by the user. In some cases, the mobile phone may be configurable to enter and exit the silent/quiet mode on a schedule. For example, a user may configure a phone to enter silent mode at 11:00 PM and then resume the normal mode at 6:00 AM. While having a manual or scheduled mechanism to enter a silent mode is useful, it may be onerous for the user to constantly enter and exit silent mode manually or may provide unintended effects when the person's schedule is interrupted (e.g., by working late, attending a party, attending to a crying baby, etc.). Exiting mechanisms fail to provide a flexible or intelligent solution to this problem.

The systems and methods described herein provide a mechanism to automatically shift between standard and silent modes based on user input and context. For example, while tending to a fussy baby, a user's phone may begin to ring. The ringing may cause further stress to the baby, so instinctively the users says "shhh" to the phone. While not specifically programmed to do so, because of the context (e.g., the sound of a crying baby) and the user action (e.g., saying "shhh"), the phone understands the "shhh" and changes notification setting for incoming calls from an audible ring to a vibrate mode. Later, the user may interact with the phone and confirm the adjustment was proper or otherwise manually modify the inferential rule created by the phone.

While some examples describe a phone and ringing during an incoming call, it is understood that this disclosure encompasses any type of device and any type of notification. For example, notifications of new text messages, emails, social networking posts, or the like on a computer, laptop, hybrid, wearable device, tablet, in-vehicle infotainment system, or the like, may be managed by systems and mechanisms described herein.

Figure 1:
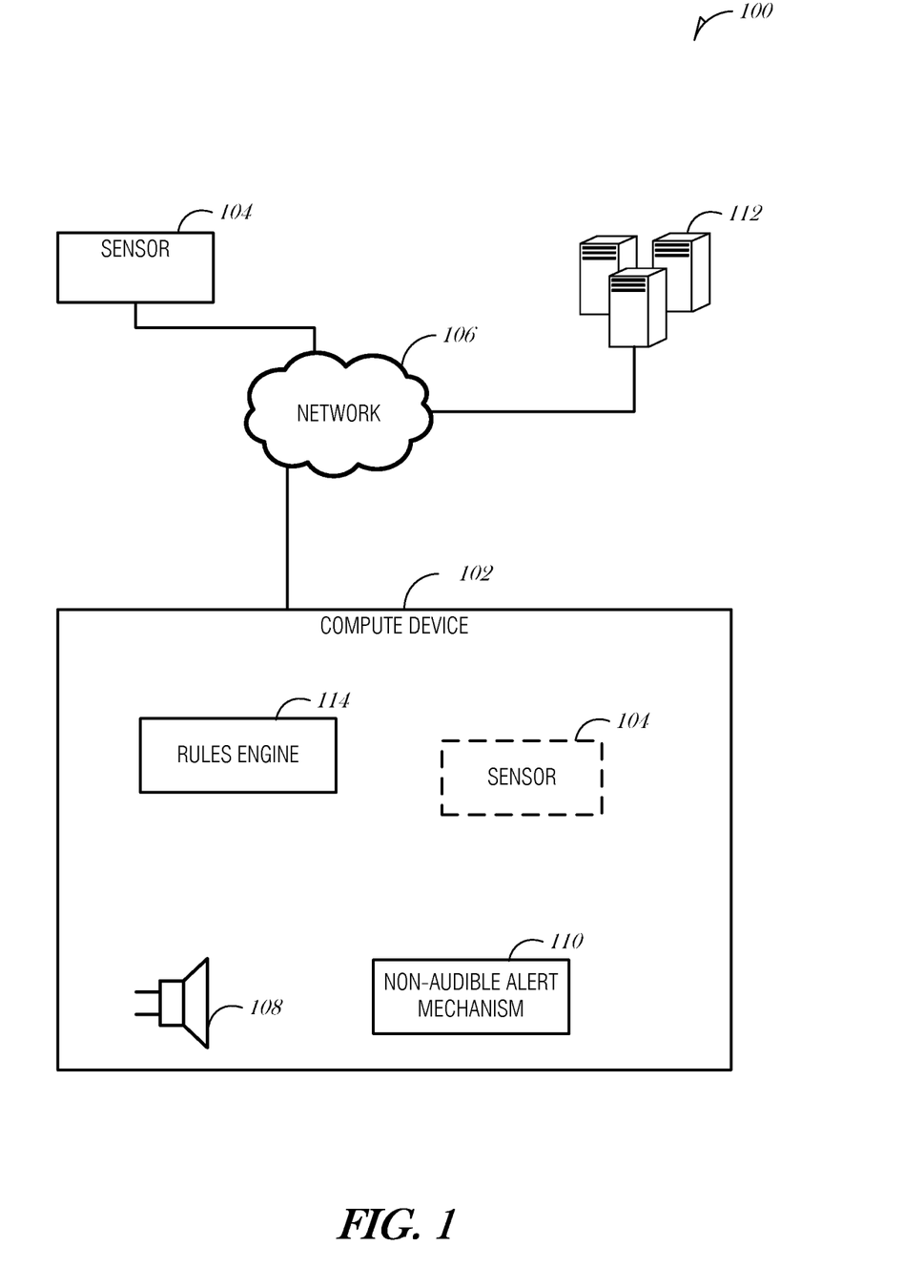
FIG. 1 is a schematic drawing illustrating a system for an intelligent ringer in smartphones, according to an embodiment.

FIG. 1 is a schematic drawing illustrating a system 100 for an intelligent ringer in smartphones, according to an embodiment. The system 100 includes a compute device 102 and a sensor 104, which are communicatively coupled via a network 106. The compute device 102 may be a device such as a smartphone, cellular telephone, mobile phone, laptop computer, tablet computer, music player, wearable device (e.g., watch, glasses-based device, etc.), desktop, laptop, hybrid, in-wall, or other networked device. The compute device 102 includes a speaker 108 and a non-audible alert mechanism 110. The non-audible alert mechanism 110 may be a mechanical vibration motor or an electronic display. When in a normal mode, the compute device 102 may alert a user of an incoming call or notification using the audible alert mechanism (e.g., a ringtone). When operating in silent mode, the compute device 102 may alert the user with a vibration or vibration pattern, a visual notification, or combinations of non-audible alerts.

The sensor 104 may be remote from the compute device 102 or incorporated into the compute device 102. The sensor 104 may be paired with the compute device 102 using a short-range wireless network, such as Bluetooth®. The sensor 104 may be one of any type of sensor, including but not limited to, a camera, a posture sensor, a biometric sensor (e.g., heart rate, skin temperature, perspiration, etc.), location sensor, a microphone, an accelerometer, motion sensor, ambient light sensor, or the like. While only one sensor 104 is illustrated in FIG. 1, it is understood that more than one sensor 104 may be implemented and that some sensors may be incorporated into the compute device 102, while other sensors may be separate from the compute device 102.

The network 106 may include local-area networks (LAN), wide-area networks (WAN), wireless variant networks (e.g., wireless LAN (WLAN) such as a network conforming to an IEEE 802.11 family of standards or a wireless WAN (WWAN) such as a cellular network), the Public Switched Telephone Network (PSTN) network, ad hoc networks, personal area networks (e.g., Bluetooth) or other combinations or permutations of network protocols and network types. The network 106 may include a single local area network (LAN) or wide-area network (WAN), or combinations of LANs or WANs, such as the Internet. The various devices in FIG. 1 may be coupled to the network 106 via one or more wired or wireless connections.

The compute device 102 may also be communicatively coupled to the server system 112. The server system 112 may provide one of a variety of services including, but not limited to, a social network platform, a retail shopping platform, a weather forecast or history, an appointment calendar, email, text messaging, instant messaging, voice over Internet Protocol (VOIP), or the like.

In use, the compute device 102 may sense an incoming communication, such as a phone call. The compute device 102 may provide a notification of the incoming communication using a default or last used notification mechanism. Notification mechanisms may include audible ringing with various chimes, music, or tones, and in various volumes; vibration in various patterns and intensities; visual alerts such as flashing a display screen, or presenting a notification icon, message, or screen; or combinations of these. For example, the default notification mechanism for an incoming phone call may be an audible ringing. Before or during the notification (e.g., ringing), the compute device 102 may monitor ambient noise using the sensor 104 (e.g., a microphone). If a user makes an audible signal, such as a voice command, such as "be quiet", or a non-language command such as "shhh", the compute device 102 may recognize the audible signal and process it with a rules engine 114. The rules engine 114 may assess the situation based on contextual information, such as noise levels, time of day, or data from the server system 112 (e.g., appointment calendar). For example, the compute device 102 may determine that it is 1:30 PM and that the user has a meeting scheduled for that time. Also, based on a location sensor (e.g., GPS or GLONASS), the compute device 102 may determine that the user is at work in a conference room. Using this contextual information and the audible signal from the user, the compute device 102 may reduce the volume of the notification or change the notification mechanism from audible ringing to a vibration. Depending on who the caller is, the compute device 102 may not take any action. For example, if the caller is the user's doctor, then the compute device 102 may continue to notify the user with an audible ring.

The rules engine 114 may have a variety of contextual information available to it, such as: where is the compute device 102, what is its pattern of motion (e.g., is it moving), what is the pattern of ambient light, what is the pattern of ambient sound, how has the user reacted to calls from this person in the past in similar contexts, the number of calls in immediate past and how they were answered, average length of time spent with caller, hold behavior (e.g., is this caller more likely to be put on hold), user's schedule (e.g., calendar events), instant messaging status (e.g., busy, away, logged off), or the application producing the notification (e.g., phone, instant messaging, social network notification, system notification, etc.), among others.

The rules engine 114 may have a variety of different responses to the contextual information and the audible signal from the user including, but not limited to hanging up on the caller, intelligent assistant answering the call, changing the ringer from loud to softer, changing the notification from audible to vibrate to visual, or interrupt an existing on-going call (e.g., notify the user that a call is on the other line).

Figure 2:
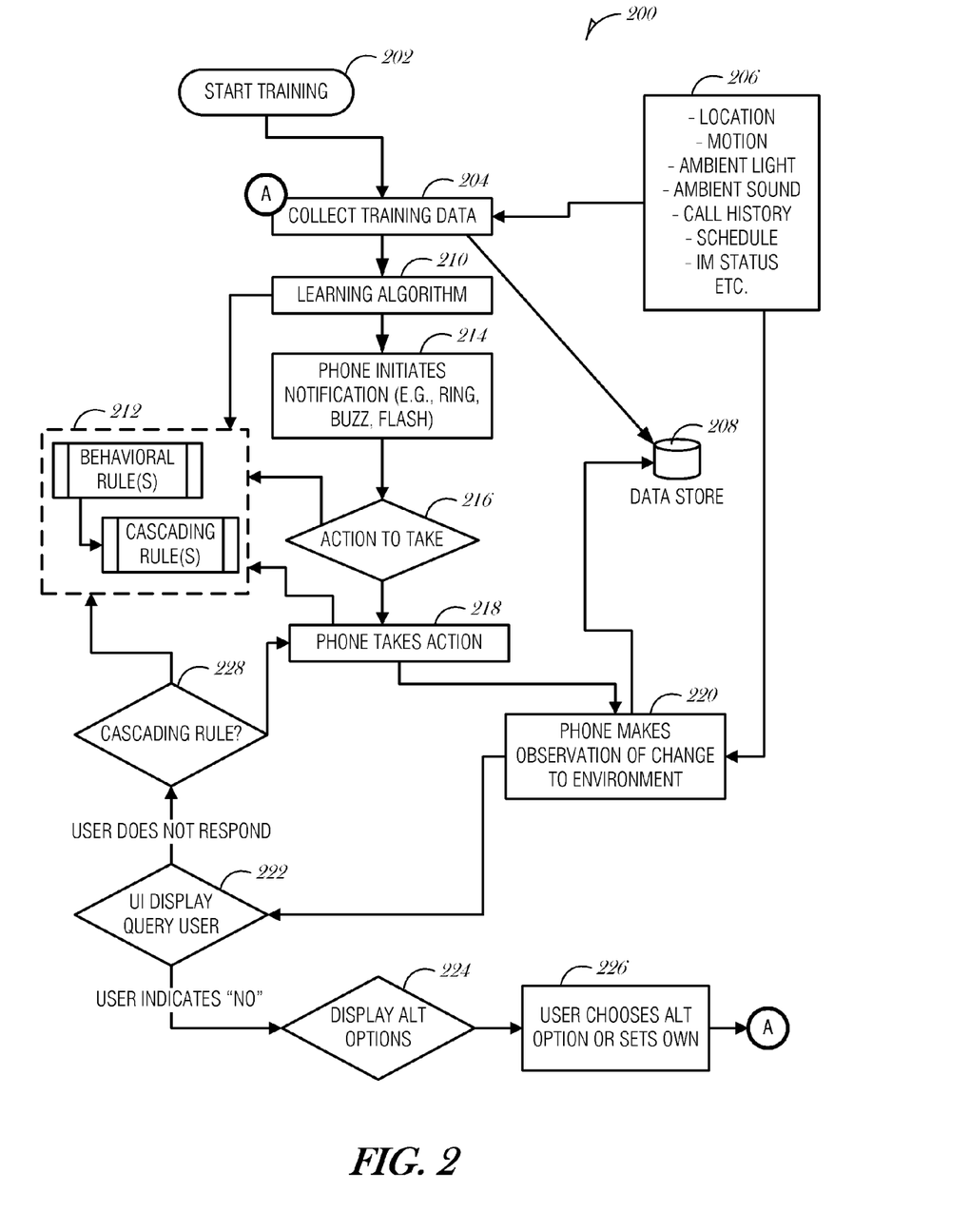
FIG. 2 is a data and control flow diagram illustrating a process for an intelligent ringer in smartphones, according to an embodiment.

FIG. 2 is a data and control flow diagram illustrating a process 200 for an intelligent ringer in smartphones, according to an embodiment. The process 200 begins when a user obtains a new phone with a system for intelligent ringing installed. At block 202, the system on the phone begins training. As the phone is used, it collects training data (block 204). For example, when a phone call from a particular caller is received and the user answers, that information may be collected. Illustrative data includes various contextual data (block 206), such as the phone's location, motion, ambient light or sound around the phone, call history, a user's schedule (e.g., appointment calendar), an instant messaging status (e.g., busy, away, do not disturb, logged off, etc.), and other environmental or contextual data. Some or all of the contextual data 206 may be stored in a data store 208. The data store 208 may be at the phone or remote from the phone. Portions of the data store 208 may be in one location with other portions at a different location.

The contextual data (block 206) is implemented in a learning algorithm (block 210). The learning algorithm (block 210) creates or modifies one or more behavioral rules or cascading rules (item 212). The behavioral rules 212 may be pre-set and installed (e.g., from the manufacturer or phone provider). The behavioral rules 212 may be created as the user uses the phone (e.g., based on training data).

Behavioral rules 212 are used by the system to determine how the phone should react under various circumstances. Cascading rules 212 are behavioral rules that are used in as a situation progress. For example, when a phone initially rings, then a behavioral rule 212 may be used to determine the volume or type of ring used. If the phone is not answered in 10 seconds, then a cascading rule 212 may be used to determine a follow on action by the phone (e.g., increase volume if from an important person).

Continuing with the example illustrated in FIG. 2, at block 214, the phone receives a call and initiates a notification (e.g., a ring, buzz, flashing, etc.). Based on the learning algorithm 210 and the behavior rules 212, the action to take is determined (block 216). For example, the phone was last moved within the last ten minutes (e.g., detected via an accelerometer in the phone), the phone is not currently in a vehicle (e.g., detected via GPS data), the phone is in a lighted area (e.g., detected from a light meter), and the ambient sound is measured to be at a minimal level (e.g., detected via a microphone).

At block 218, the phone takes the action. For example, the phone may provide a notification with an audible ringer. The system on the phone makes ongoing observations (block 220) of the environment, user response, contextual cues, etc. Additional contextual or environmental data may be obtained, such as a person's voice command, or a change in ambient lighting.

At block 222, a user interface prompt is displayed asking the user whether the initial action taken at block 218 was appropriate. If the user indicates "no", then the flow moves to block 224, where alternative actions are displayed. Alternative actions may be actions like silencing the ringer, changing the volume of the ringer, changing the notification type (e g, changing from an audible ring to a vibration notification), or the like. At block 226, the user chooses an alternative option or sets their own option. The process 200 returns to block 204, where additional training data is collected and the learning algorithm 210 is used to update the behavioral rules 212 based on the user's feedback obtained at block 226.

Continuing with the example, the phone may be aware that it is ringing and that the ringer is audible at a medium volume level. While the phone is ringing, it recognizes a change in ambient sound. The sound may be a dog barking, a person saying "shhh" or "ring louder please", a baby crying, or the sound of feet running. Because the phone has been learning the user behavior, it is able to match the changes in ambient sound to the actions that the user has previously taken. It does not matter what the sound (or word) is just that the system may recognize the sound (or lack of sound) and may then make an intelligent decision without being preprogrammed to do so.

If the user does not respond to the user interface prompt, then the processes moves to block 228, where a cascading rule 212 may be implemented. Whether a cascading rule 212 is used is determined by the learning algorithm 210 and the contextual information (item 206), such as the sound of someone saying "shhh."

In general, the action (e.g., notification mode) may not change. For example, where there is no change in ambient sound, light, or other contextual cues, then the action is not affected. However, if there is a change in some contextual data, then the system may use the learning algorithm 210 to identify a cascading rule 212 or some other action. Cascading rules may be organized in a decreasing order of "harshness" with respect to the caller. The harshest response is to hang up on the caller. The least harsh response is to provide a notification to the recipient. An example hierarchy of responses from least harsh to most harsh include: audible ring, vibrate, intelligent answering service, voicemail, and disconnect. An intelligent answering service is one that may answer the caller, indicate that it is a non-human answering service, and provide an option to the caller to either leave a message or have the intelligent answering service offer an option to wait as the service attempts to contact and notify the recipient using a different communication channel. For example, the intelligent answering service may attempt to contact the recipient with a text message, an alternate phone number, or by changing the notification (e.g., increasing volume).

In a slightly different scenario, the phone may look at its collected contextual data. In an example, the phone number (e.g., caller ID) is a number that the user typically answers quickly while placing other callers on hold. As a result, the caller is assumed to be important to the user. Thus, because the caller is weighted as being important and the phone was recently handled (e.g., from accelerometer data), the phone switches to audible ringer at a louder volume assuming that the user is nearby.

After determining whether to implement a cascading rule 212 or maintain the current behavioral rule 212, the process 200 proceeds to block 218, where the phone executes the new action or continues the existing action.

The following table (TABLE 1) represents a series of samples taken over time where sample (t) is a time stamp, event (e) is a type of event (e.g., phone call, alarm, etc.), a is light brightness in lumens, b is location in latitude/longitude, c is ambient sound level (dB), d is ambient velocity (e.g., simplified to movement value), and e is event sub-type (e.g., call from, alarm name, etc.).

TABLE 1

| sample (t) | event (e)   | a  | b            | c  | d | e    |
|------------|-------------|----|--------------|----|---|------|
| 1.000      | data gather | 12 | 45.52, −122.98 | 35 | 2 | none |
| 3.000      | data gather | 13 | 45.52, −122.98 | 34 | 2 | none |
| 5.000      | data gather | 12 | 45.52, −122.98 | 33 | 2 | none |
| 7.000      | data gather | 14 | 45.52, −122.98 | 36 | 2 | none |
| 9.000      | data gather | 13 | 45.52, −122.98 | 32 | 3 | none |
| 11.000     | data gather | 12 | 45.52, −122.98 | 34 | 2 | none |
| 13.000     | data gather | 11 | 45.52, −122.98 | 33 | 2 | none |
| 15.000     | data gather | 12 | 45.52, −122.99 | 35 | 2 | none |
| 17.000     | data gather | 12 | 45.52, −122.98 | 34 | 2 | none |
| 19.000     | data gather | 12 | 45.52, −122.98 | 35 | 2 | none |

During the sampling period shown there were no actions triggered by the phone. This may represent when the user is asleep and the phone is idle on a bedside table, for example. During a later sampling period (illustrated in TABLE 2), a phone call arrives at sample (t) of 48.000. At sample (t) 48.010, the system observes a data outlier where c is 100 dB. This is apparently temporally related to the triggering of the audible alarm at sample (t) of 48.000. At sample (t) 48.011, the phone adjusts the ringer based on the loud ambient noise received at sample (t) 48.010. The noise detected at sample (t) 48.010 may be analyzed to determine whether it represents a voice command or some other recognizable verbal phrase. Thus, the reactive action at sample (t) 48.011 may be due to just the fact that there was a significant outlier (apparently) in response to the notification, or may be more insightful and be in response to what the outlier data appears to represent.

TABLE 2

| sample (t) | event (e)                | a  | b              | c   | d | e    |
|------------|--------------------------|----|----------------|-----|---|------|
| 45.000     | data gather              | 12 | 45.52, −122.98 | 35  | 2 | none |
| 48.000     | phone call, audible ring | 14 | 45.52, −122.98 | 36  | 2 | from John |
| 48.010     | data gather              | 13 | 45.52, −122.98 | 100 | 3 | none |
| 48.011     | device set ringer to vibrate |  |            |     |   |      |
| 48.012     | data gather              | 11 | 45.52, −122.98 | 33  | 2 | none |
| 48.020     | phone call, vibrate ring | 14 | 45.52, −122.98 | 36  | 2 | from John |
| 49.000     | data gather              | 11 | 45.52, −122.98 | 33  | 2 | none |
| 50.000     | phone call, vibrate ring | 14 | 45.52, −122.98 | 36  | 2 | from John |
| 51.000     | data gather              | 12 | 45.52, −122.98 | 34  | 2 | none |
| 52.000     | phone call answered      |    |                |     |   |      |
| 53.000     | log rule                 |    |                |     |   |      |
| 75.000     | data gather              | 12 | 45.52, −122.98 | 35  | 2 | none |
| 76.000     | data gather              | 12 | 45.52, −122.98 | 35  | 2 | none |

The system (e.g., a smartphone) described above may continually gather environmental data (e.g., sound, light, etc.). The system uses an event (e.g., smartphone ringing) to trigger analysis for either an existing rule or to develop a new rule. The primary mathematical functions employed in the analysis are outlier analysis and correlations. The system is not intended to be perfect. Instead, as it gathers data, the data is used to develop rules (behaviors), which may be reinforced over time as it observes similar situations and reactions. The system is designed to learn as well as to train the user. The system trains the user by encouraging behavior that creates an easily identified outlier.

Figure 3:
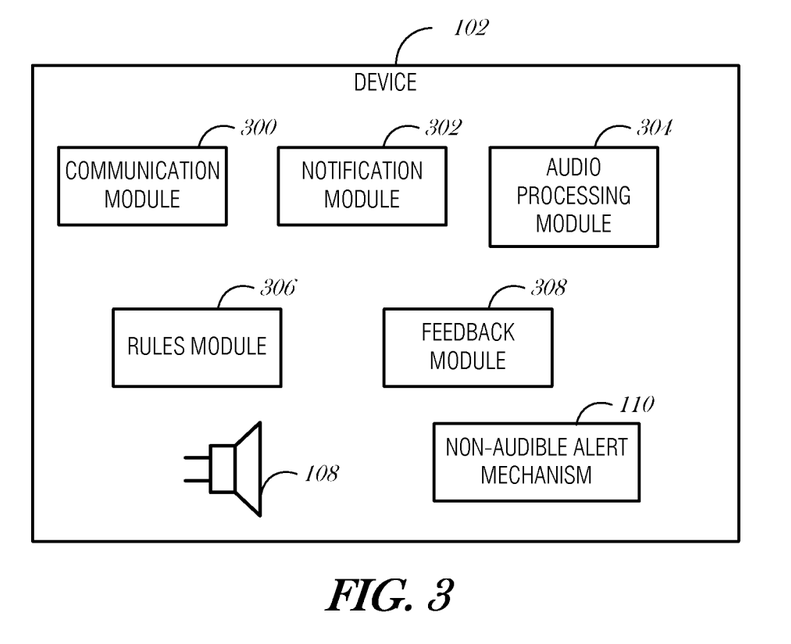
FIG. 3 is a block diagram illustrating a compute device for implementing intelligent notifications, according to an embodiment.

FIG. 3 is a block diagram illustrating a compute device 102 for implementing intelligent notifications, according to an embodiment. The compute device 102 may include a communication module 300, a notification module 302, an audio processing module 304, and a rules module 306.

The communication module 300 may be configured to receive at a compute device, an indication of an incoming communication. In various embodiments, the incoming communication is one of a text message, a phone call, an email, or an alarm, or a system message.

The notification module 302 may be configured to present from the compute device, a notification of the incoming communication. In an embodiment, to present the notification of the incoming communication, the notification module is to use an audible ring. In an embodiment, to present the notification of the incoming communication, the notification module is to use a vibrating ring. In an embodiment, to present the notification of the incoming communication, the notification module is to display the notification on a display. In a further embodiment, the display is integrated into the compute device. In alternative embodiments, the display may be separate from the compute device, such as a monitor on a wall, an in-vehicle in-dash system, or a wearable device (e.g., smartglasses).

The audio processing module 304 may be configured to determine whether a change in ambient noise occurs around the compute device while the notification is being presented. In an embodiment, to determine whether the change in ambient noise occurs around the compute device while the notification is being presented, the audio processing module is to activate a microphone to sense ambient noise before presenting the notification of the incoming communication, analyze ambient noise sensed by the microphone before and during presenting the notification of the incoming communication, and determine whether the ambient noise prior to presenting the notification was different than the ambient noise after presenting the notification by more than a threshold amount. In a further embodiment, the audio processing module 304 is to identify a sound token in the ambient noise during presenting the notification of the incoming communication. To reference the rules engine to determine the action based on whether the change in ambient noise occurs, the rules module 306 is to use the sound token to determine the action. In an embodiment, the sound token includes a verbal command, and wherein the action determined by the rules engine includes reducing a notification severity of the notification and presenting the notification with the reduced notification severity. In a further embodiment, the notification severity includes a volume level.

The rules module 306 may be configured to reference a rules engine to determine an action based on whether the change in ambient noise occurs. In an embodiment, the action is selected from an ordered list of actions, the order based from a less harsh responsive mechanism to a more harsh responsive mechanism. Less harsh responsive mechanisms include ringing or vibrating, whereas more harsh responsive mechanisms include forwarding to voicemail or disconnecting.

In an embodiment, the rules engine includes a mapping from an input sound token to an output notification type and severity level. For example, the sound token may be a verbal cue of "be quiet" and the output notification type may be "audible ring" with a severity level of "low," which may represent a low ringer volume (e.g., 3 out of 10 on the volume settings).

In an embodiment, the rules module 306 is to reference contextual information available to the compute device and use the contextual information in the rules engine to determine the action. In a further embodiment, the contextual information is one of a time, a date, ambient noise level, ambient light level, a motion history of the compute device, an identity of a sender of the communication, an identity of a person proximate to the compute device, geographic location, temperature, or a history of similar notifications and resulting user actions.

The notification module 302 may be configured to modify the notification in accordance with the action. In an embodiment, to modify the notification in accordance with the action, the notification module 302 is to increase a volume of the notification. In an embodiment, to modify the notification in accordance with the action, the notification module 302 is to decrease a volume of the notification. In an embodiment, to modify the notification in accordance with the action, the notification module 302 is to change from an audible notification to a vibrating notification. In an embodiment, to modify the notification in accordance with the action, the notification module 302 is to continue to present the notification without change.

In an embodiment, the compute device 102 includes a feedback module 308, to present a feedback interface to a user of the compute device and receive feedback from the user. In such an embodiment, the feedback is incorporated into the rules engine, which may modify an action.

Various modules (e.g., modules 300 and 302) may be incorporated or integrated into an application that executes on the compute device 102. The application may execute in the background and collect data from the sensors and populate a database, which may be accessed by one or more other applications. Multiple applications may be developed to use the real-time or historical data for various purposes.

Figure 4:
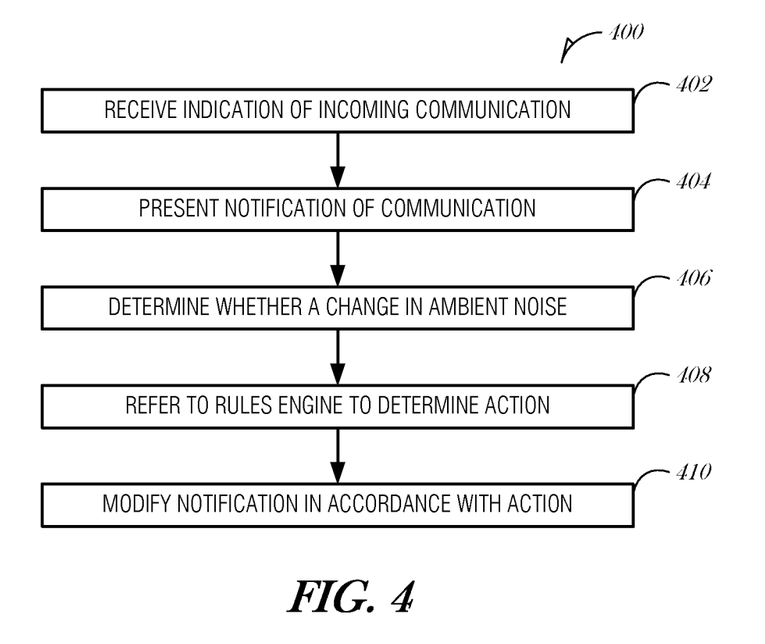
FIG. 4 is a flowchart illustrating a method of implementing intelligent notifications, according to an embodiment.

FIG. 4 is a flowchart illustrating a method 400 of implementing intelligent notifications, according to an embodiment. At block 402, an indication of an incoming communication is received at a compute device. In various embodiments, the incoming communication is one of a text message, a phone call, an email, or an alarm, or a system message.

At block 404, a notification of the incoming communication is presented from the compute device. In an embodiment, presenting the notification of the incoming communication comprises using an audible ring. In an embodiment, presenting the notification of the incoming communication comprises using a vibrating ring. In an embodiment, presenting the notification of the incoming communication comprises displaying the notification on a display. In a further embodiment, the display is integrated into the compute device.

At block 406, it is determined whether a change in ambient noise occurs around the compute device while the notification is being presented.

At block 408, a rules engine is referenced to determine an action based on whether the change in ambient noise occurs. In an embodiment, the action is selected from an ordered list of actions, the order based from a less harsh responsive mechanism to a more harsh responsive mechanism. In an embodiment, the rules engine includes a mapping from an input sound token to an output notification type and severity level.

At block 410, the notification is modified in accordance with the action. In an embodiment, modifying the notification in accordance with the action comprises increasing a volume of the notification. In an embodiment, modifying the notification in accordance with the action comprises decreasing a volume of the notification. In an embodiment, modifying the notification in accordance with the action comprises changing from an audible notification to a vibrating notification. In an embodiment, modifying the notification in accordance with the action comprises continuing to present the notification without change.

In an embodiment, determining whether the change in ambient noise occurs around the compute device while the notification is being presented comprises activating a microphone to sense ambient noise before presenting the notification of the incoming communication, analyzing ambient noise sensed by the microphone before and during presenting the notification of the incoming communication, and determining whether the ambient noise prior to presenting the notification was different than the ambient noise after presenting the notification by more than a threshold amount. In a further embodiment, the method 400 includes identifying a sound token in the ambient noise during presenting the notification of the incoming communication, where referencing the rules engine to determine the action based on whether the change in ambient noise occurs comprises using the sound token to determine the action. In a further embodiment, the sound token includes a verbal command, and wherein the action determined by the rules engine includes reducing a notification severity of the notification and presenting the notification with the reduced notification severity. In another embodiment, the notification severity includes a volume level.

In an embodiment, the method 400 includes referencing contextual information available to the compute device and using the contextual information in the rules engine to determine the action. In a further embodiment, the contextual information is one of a time, a date, ambient noise level, ambient light level, a motion history of the compute device, an identity of a sender of the communication, an identity of a person proximate to the compute device, geographic location, temperature, or a history of similar notifications and resulting user actions.

In an embodiment, the method 400 includes presenting a feedback interface to a user of the compute device, receiving feedback from the user, and incorporating the feedback into the rules engine.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

Figure 5:
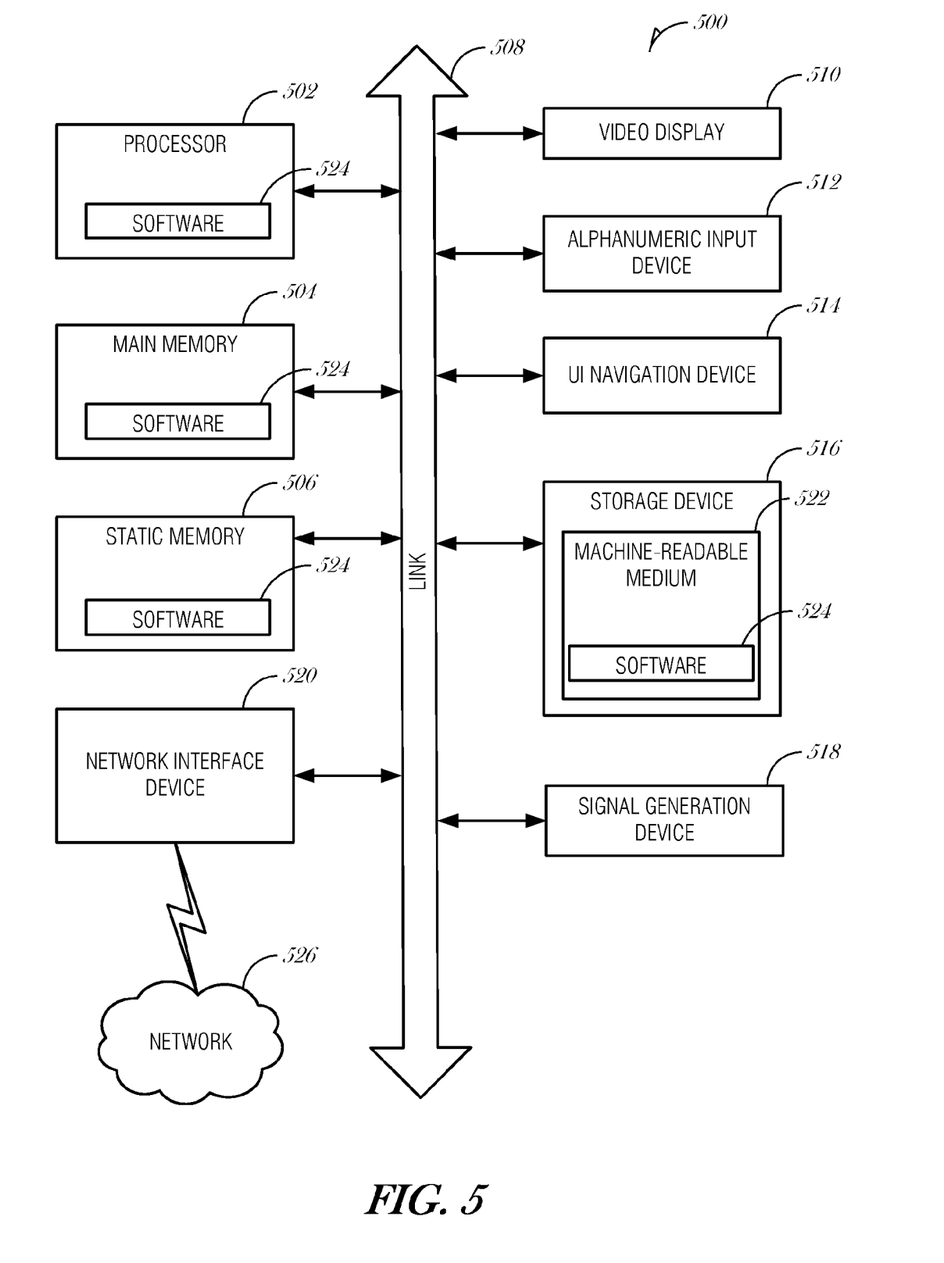
FIG. 5 is a block diagram illustrating an example machine upon which any one or more of the techniques (e.g., methodologies) discussed herein may perform, according to an example embodiment.

FIG. 5 is a block diagram illustrating a machine in the example form of a computer system 500, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 500 includes at least one processor 502 (e.g., a central processing unit (CPU), a graphics processing unit (GPU) or both, processor cores, compute nodes, etc.), a main memory 504 and a static memory 506, which communicate with each other via a link 508 (e.g., bus). The computer system 500 may further include a video display unit 510, an alphanumeric input device 512 (e.g., a keyboard), and a user interface (UI) navigation device 514 (e.g., a mouse). In one embodiment, the video display unit 510, input device 512 and UI navigation device 514 are incorporated into a touch screen display. The computer system 500 may additionally include a storage device 516 (e.g., a drive unit), a signal generation device 518 (e.g., a speaker), a network interface device 520, and one or more sensors (not shown), such as a global positioning system (GPS) sensor, compass, accelerometer, or other sensor.

The storage device 516 includes a machine-readable medium 522 on which is stored one or more sets of data structures and instructions 524 (e.g., software) embodying or utilized by any one or more of the methodologies or functions described herein. The instructions 524 may also reside, completely or at least partially, within the main memory 504, static memory 506, and/or within the processor 502 during execution thereof by the computer system 500, with the main memory 504, static memory 506, and the processor 502 also constituting machine-readable media.

While the machine-readable medium 522 is illustrated in an example embodiment to be a single medium, the term "machine-readable medium" may include a single medium or multiple media (e.g., a centralized or distributed database, and/or associated caches and servers) that store the one or more instructions 524. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 524 may further be transmitted or received over a communications network 526 using a transmission medium via the network interface device 520 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter (such as a device, apparatus, or machine) for implementing intelligent notifications comprising: a communication module to receive at a compute device, an indication of an incoming communication; a notification module to present from the compute device, a notification of the incoming communication; an audio processing module to determine whether a change in ambient noise occurs around the compute device while the notification is being presented; and a rules module to reference a rules engine to determine an action based on whether the change in ambient noise occurs; wherein the notification module is to modify the notification in accordance with the action.

In Example 2, the subject matter of Example 1 may include, wherein the incoming communication is one of a text message, a phone call, an email, or an alarm, or a system message.

In Example 3, the subject matter of any one of Examples 1 to 2 may include, wherein to present the notification of the incoming communication, the notification module is to use an audible ring.

In Example 4, the subject matter of any one of Examples 1 to 3 may include, wherein to present the notification of the incoming communication, the notification module is to use a vibrating ring.

In Example 5, the subject matter of any one of Examples 1 to 4 may include, wherein to present the notification of the incoming communication, the notification module is to display the notification on a display.

In Example 6, the subject matter of any one of Examples 1 to 5 may include, wherein the display is integrated into the compute device.

In Example 7, the subject matter of any one of Examples 1 to 6 may include, wherein to determine whether the change in ambient noise occurs around the compute device while the notification is being presented, the audio processing module is to: activate a microphone to sense ambient noise before presenting the notification of the incoming communication; analyze ambient noise sensed by the microphone before and during presenting the notification of the incoming communication; and determine whether the ambient noise prior to presenting the notification was different than the ambient noise after presenting the notification by more than a threshold amount.

In Example 8, the subject matter of any one of Examples 1 to 7 may include, wherein the audio processing module is to identify a sound token in the ambient noise during presenting the notification of the incoming communication; and wherein to reference the rules engine to determine the action based on whether the change in ambient noise occurs, the rules module is to use the sound token to determine the action.

In Example 9, the subject matter of any one of Examples 1 to 8 may include, wherein the sound token includes a verbal command, and wherein the action determined by the rules engine includes reducing a notification severity of the notification and presenting the notification with the reduced notification severity.

In Example 10, the subject matter of any one of Examples 1 to 9 may include, wherein the notification severity includes a volume level.

In Example 11, the subject matter of any one of Examples 1 to 10 may include, wherein the action is selected from an ordered list of actions, the order based from a less harsh responsive mechanism to a more harsh responsive mechanism.

In Example 12, the subject matter of any one of Examples 1 to 11 may include, wherein the rules engine includes a mapping from an input sound token to an output notification type and severity level.

In Example 13, the subject matter of any one of Examples 1 to 12 may include, wherein the rules module is to: reference contextual information available to the compute device; and use the contextual information in the rules engine to determine the action.

In Example 14, the subject matter of any one of Examples 1 to 13 may include, wherein the contextual information is one of a time, a date, ambient noise level, ambient light level, a motion history of the compute device, an identity of a sender of the communication, an identity of a person proximate to the compute device, geographic location, temperature, or a history of similar notifications and resulting user actions.

In Example 15, the subject matter of any one of Examples 1 to 14 may include, wherein to modify the notification in accordance with the action, the notification module is to increase a volume of the notification.

In Example 16, the subject matter of any one of Examples 1 to 15 may include, wherein to modify the notification in accordance with the action, the notification module is to decrease a volume of the notification.

In Example 17, the subject matter of any one of Examples 1 to 16 may include, wherein to modify the notification in accordance with the action, the notification module is to change from an audible notification to a vibrating notification.

In Example 18, the subject matter of any one of Examples 1 to 17 may include, wherein to modify the notification in accordance with the action, the notification module is to continue to present the notification without change.

In Example 19, the subject matter of any one of Examples 1 to 18 may include, a feedback module to: present a feedback interface to a user of the compute device; receive feedback from the user; and incorporate the feedback into the rules engine.

Example 20 includes subject matter (such as a method, means for performing acts, machine readable medium including instructions that when performed by a machine cause the machine to performs acts, or an apparatus to perform) for implementing intelligent notifications comprising: receiving at a compute device, an indication of an incoming communication; presenting from the compute device, a notification of the incoming communication; determining whether a change in ambient noise occurs around the compute device while the notification is being presented; referencing a rules engine to determine an action based on whether the change in ambient noise occurs; and modifying the notification in accordance with the action.

In Example 21, the subject matter of Example 20 may include, wherein the incoming communication is one of a text message, a phone call, an email, or an alarm, or a system message.

In Example 22, the subject matter of any one of Examples 20 to 21 may include, wherein presenting the notification of the incoming communication comprises using an audible ring.

In Example 23, the subject matter of any one of Examples 20 to 22 may include, wherein presenting the notification of the incoming communication comprises using a vibrating ring.

In Example 24, the subject matter of any one of Examples 20 to 23 may include, wherein presenting the notification of the incoming communication comprises displaying the notification on a display.

In Example 25, the subject matter of any one of Examples 20 to 24 may include, wherein the display is integrated into the compute device.

In Example 26, the subject matter of any one of Examples 20 to 25 may include, wherein determining whether the change in ambient noise occurs around the compute device while the notification is being presented comprises: activating a microphone to sense ambient noise before presenting the notification of the incoming communication; analyzing ambient noise sensed by the microphone before and during presenting the notification of the incoming communication; and determining whether the ambient noise prior to presenting the notification was different than the ambient noise after presenting the notification by more than a threshold amount.

In Example 27, the subject matter of any one of Examples 20 to 26 may include, identifying a sound token in the ambient noise during presenting the notification of the incoming communication; and wherein referencing the rules engine to determine the action based on whether the change in ambient noise occurs comprises using the sound token to determine the action.

In Example 28, the subject matter of any one of Examples 20 to 27 may include, wherein the sound token includes a verbal command, and wherein the action determined by the rules engine includes reducing a notification severity of the notification and presenting the notification with the reduced notification severity.

In Example 29, the subject matter of any one of Examples 20 to 28 may include, wherein the notification severity includes a volume level.

In Example 30, the subject matter of any one of Examples 20 to 29 may include, wherein the action is selected from an ordered list of actions, the order based from a less harsh responsive mechanism to a more harsh responsive mechanism.

In Example 31, the subject matter of any one of Examples 20 to 30 may include, wherein the rules engine includes a mapping from an input sound token to an output notification type and severity level.

In Example 32, the subject matter of any one of Examples 20 to 31 may include, referencing contextual information available to the compute device; and using the contextual information in the rules engine to determine the action.

In Example 33, the subject matter of any one of Examples 20 to 32 may include, wherein the contextual information is one of a time, a date, ambient noise level, ambient light level, a motion history of the compute device, an identity of a sender of the communication, an identity of a person proximate to the compute device, geographic location, temperature, or a history of similar notifications and resulting user actions.

In Example 34, the subject matter of any one of Examples 20 to 33 may include, wherein modifying the notification in accordance with the action comprises increasing a volume of the notification.

In Example 35, the subject matter of any one of Examples 20 to 34 may include, wherein modifying the notification in accordance with the action comprises decreasing a volume of the notification.

In Example 36, the subject matter of any one of Examples 20 to 35 may include, wherein modifying the notification in accordance with the action comprises changing from an audible notification to a vibrating notification.

In Example 37, the subject matter of any one of Examples 20 to 36 may include, wherein modifying the notification in accordance with the action comprises continuing to present the notification without change.

In Example 38, the subject matter of any one of Examples 20 to 37 may include, presenting a feedback interface to a user of the compute device; receiving feedback from the user; and incorporating the feedback into the rules engine.

Example 39 includes at least one machine-readable medium including instructions, which when executed by a machine, cause the machine to perform operations of any of the Examples 20-38.

Example 40 includes an apparatus comprising means for performing any of the Examples 20-38.

Example 41 includes subject matter (such as a device, apparatus, or machine) for implementing intelligent notifications comprising: means for receiving at a compute device, an indication of an incoming communication; means for presenting from the compute device, a notification of the incoming communication; means for determining whether a change in ambient noise occurs around the compute device while the notification is being presented; means for referencing a rules engine to determine an action based on whether the change in ambient noise occurs; and means for modifying the notification in accordance with the action.

In Example 42, the subject matter of Example 41 may include, wherein the incoming communication is one of a text message, a phone call, an email, or an alarm, or a system message.

In Example 43, the subject matter of any one of Examples 41 to 42 may include, wherein the means for presenting the notification of the incoming communication comprise means for using an audible ring.

In Example 44, the subject matter of any one of Examples 41 to 43 may include, wherein the means for presenting the notification of the incoming communication comprise means for using a vibrating ring.

In Example 45, the subject matter of any one of Examples 41 to 44 may include, wherein the means for presenting the notification of the incoming communication comprise means for displaying the notification on a display.

In Example 46, the subject matter of any one of Examples 41 to 45 may include, wherein the display is integrated into the compute device.

In Example 47, the subject matter of any one of Examples 41 to 46 may include, wherein the means for determining whether the change in ambient noise occurs around the compute device while the notification is being presented comprise: means for activating a microphone to sense ambient noise before presenting the notification of the incoming communication; means for analyzing ambient noise sensed by the microphone before and during presenting the notification of the incoming communication; and means for determining whether the ambient noise prior to presenting the notification was different than the ambient noise after presenting the notification by more than a threshold amount.

In Example 48, the subject matter of any one of Examples 41 to 47 may include, means for identifying a sound token in the ambient noise during presenting the notification of the incoming communication; and wherein the means for referencing the rules engine to determine the action based on whether the change in ambient noise occurs comprise means for using the sound token to determine the action.

In Example 49, the subject matter of any one of Examples 41 to 48 may include, wherein the sound token includes a verbal command, and wherein the action determined by the rules engine includes reducing a notification severity of the notification and presenting the notification with the reduced notification severity.

In Example 50, the subject matter of any one of Examples 41 to 49 may include, wherein the notification severity includes a volume level.

In Example 51, the subject matter of any one of Examples 41 to 50 may include, wherein the action is selected from an ordered list of actions, the order based from a less harsh responsive mechanism to a more harsh responsive mechanism.

In Example 52, the subject matter of any one of Examples 41 to 51 may include, wherein the rules engine includes a mapping from an input sound token to an output notification type and severity level.

In Example 53, the subject matter of any one of Examples 41 to 52 may include, means for referencing contextual information available to the compute device; and means for using the contextual information in the rules engine to determine the action.

In Example 54, the subject matter of any one of Examples 41 to 53 may include, wherein the contextual information is one of a time, a date, ambient noise level, ambient light level, a motion history of the compute device, an identity of a sender of the communication, an identity of a person proximate to the compute device, geographic location, temperature, or a history of similar notifications and resulting user actions.

In Example 55, the subject matter of any one of Examples 41 to 54 may include, wherein the means for modifying the notification in accordance with the action comprise means for increasing a volume of the notification.

In Example 56, the subject matter of any one of Examples 41 to 55 may include, wherein the means for modifying the notification in accordance with the action comprise means for decreasing a volume of the notification.

In Example 57, the subject matter of any one of Examples 41 to 56 may include, wherein the means for modifying the notification in accordance with the action comprise means for changing from an audible notification to a vibrating notification.

In Example 58, the subject matter of any one of Examples 41 to 57 may include, wherein the means for modifying the notification in accordance with the action comprise means for continuing to present the notification without change.

In Example 59, the subject matter of any one of Examples 41 to 58 may include, means for presenting a feedback interface to a user of the compute device; means for receiving feedback from the user; and means for incorporating the feedback into the rules engine.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system for implementing intelligent notifications, the system comprising:
   a communication circuit to receive at a compute device, an indication of an incoming communication;
   a notification circuit to present from the compute device, a notification of the incoming communication;
   an audio processing circuit to determine whether a change in ambient noise occurs around the compute device while the notification is being presented; and
   a rules circuit to reference a rules engine to determine an action based on whether the change in ambient noise occurs during presentation of the notification; wherein the notification circuit is to modify the notification in accordance with the action,
   wherein to determine whether the change in ambient noise occurs around the compute device while the notification is being presented, the audio processing circuit is to:
      activate a microphone to sense ambient noise before presenting the notification of the incoming communication;
      analyze ambient noise sensed by the microphone before and during presenting the notification of the incoming communication; and
      determine whether the ambient noise prior to presenting the notification was different than the ambient noise after presenting the notification by more than a threshold amount.

2. The system of claim 1, wherein the incoming communication is one of a text message, a phone call, an email, or an alarm, or a system message.

3. The system of claim 1, wherein to present the notification of the incoming communication, the notification circuit is to use an audible ring.

4. The system of claim 1, wherein to present the notification of the incoming communication, the notification circuit is to use a vibrating ring.

5. The system of claim 1, wherein to present the notification of the incoming communication, the notification circuit is to display the notification on a display.

6. The system of claim 5, wherein the display is integrated into the compute device.

7. The system of claim 1, wherein the audio processing circuit is to identify a sound token in the ambient noise during presenting the notification of the incoming communication; and
   wherein to reference the rules engine to determine the action based on whether the change in ambient noise occurs, the rules circuit is to use the sound token to determine the action.

8. The system of claim 7, wherein the sound token includes a verbal command, and wherein the action determined by the rules engine includes reducing a notification severity of the notification and presenting the notification with the reduced notification severity.

9. The system of claim 8, wherein the notification severity includes a volume level.

10. The system of claim 1, wherein the action is selected from an ordered list of actions, the order based from a less harsh responsive mechanism to a more harsh responsive mechanism.

11. The system of claim 1, wherein the rules engine includes a mapping from an input sound token to an output notification type and severity level.

12. A method of implementing intelligent notifications, the method comprising:
   receiving at a compute device, an indication of an incoming communication;
   presenting from the compute device, a notification of the incoming communication;
   determining whether a change in ambient noise occurs around the compute device while the notification is being presented;
   referencing a rules engine to determine an action based on whether the change in ambient noise occurs during presentation of the notification; and
   modifying the notification in accordance with the action,
   wherein determining whether the change in ambient noise occurs around the compute device while the notification is being presented comprises:
      activating a microphone to sense ambient noise before presenting the notification of the incoming communication;
      analyzing ambient noise sensed by the microphone before and during presenting the notification of the incoming communication; and
      determining whether the ambient noise prior to presenting the notification was different than the ambient noise after presenting the notification by more than a threshold amount.

13. The method of claim 12, wherein the incoming communication is one of a text message, a phone call, an email, or an alarm, or a system message.

14. The method of claim 13, wherein presenting the notification of the incoming communication comprises displaying the notification on a display.

15. The method of claim 12, wherein presenting the notification of the incoming communication comprises using an audible ring.

16. The method of claim 12, wherein presenting the notification of the incoming communication comprises using a vibrating ring.

17. At least one non-transitory machine-readable medium including instructions for implementing intelligent notifications, which when executed by a machine, cause the machine to:
   receive at a compute device, an indication of an incoming communication;
   present from the compute device, a notification of the incoming communication;
   determine whether a change in ambient noise occurs around the compute device while the notification is being presented;
   reference a rules engine to determine an action based on whether the change in ambient noise occurs during presentation of the notification; and
   modify the notification in accordance with the action,
   wherein the instructions to determine whether the change in ambient noise occurs around the compute device while the notification is being presented comprise instructions to:
      activate a microphone to sense ambient noise before presenting the notification of the incoming communication;
      analyze ambient noise sensed by the microphone before and during presenting the notification of the incoming communication; and determine whether the ambient noise prior to presenting the notification was different than the ambient noise after presenting the notification by more than a threshold amount.

18. The at least one non-transitory machine-readable medium of claim 17, further comprising instructions to: identify a sound token in the ambient noise during presenting the notification of the incoming communication; and wherein the instructions to reference the rules engine to determine the action based on whether the change in ambient noise occurs comprise instructions to use the sound token to determine the action.

19. The at least one non-transitory machine-readable medium of claim 18, wherein the sound token includes a verbal command, and wherein the action determined by the rules engine includes reducing a notification severity of the notification and presenting the notification with the reduced notification severity.

20. The at least one non-transitory machine-readable medium of claim 19, wherein the notification severity includes a volume level.

21. The at least one non-transitory machine-readable medium of claim 17, wherein the action is selected from an ordered list of actions, the order based from a less harsh responsive mechanism to a more harsh responsive mechanism.

22. The at least one non-transitory machine-readable medium of claim 17, wherein the rules engine includes a mapping from an input sound token to an output notification type and severity level.

23. The at least one non-transitory machine-readable medium of claim 17, further comprising instructions to:
present a feedback interface to a user of the compute device;
receive feedback from the user; and
incorporate the feedback into the rules engine.

* * * * *